Figure 1:
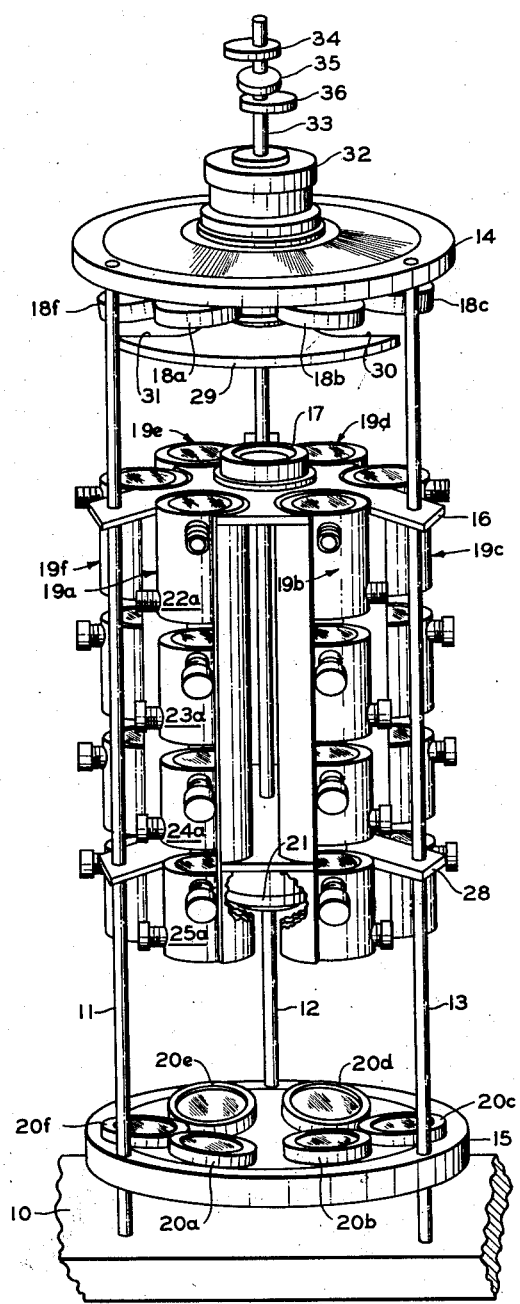

Jan. 19, 1954  J. W. HUTCHINS  2,666,854
RECORDING SYSTEM

Filed April 10, 1950  2 Sheets-Sheet 1

INVENTOR.
J. W. HUTCHINS
BY
ATTORNEYS

Jan. 19, 1954  J. W. HUTCHINS  2,666,854
RECORDING SYSTEM
Filed April 10, 1950  2 Sheets-Sheet 2

INVENTOR.
J. W. HUTCHINS
BY Hudson & Young
ATTORNEYS

Patented Jan. 19, 1954

2,666,854

UNITED STATES PATENT OFFICE 2,666,854

RECORDING SYSTEM

Joseph W. Hutchins, Bartlesville, Okla., assignor to Phillips Petroleum Company, a corporation of Delaware Application April 10, 1950, Serial No. 154,981

12 Claims. (Cl. 250—43.5)

This invention relates to a recording system for simultaneously indicating the magnitude of a plurality of outputs fed to the recorder. In one specific aspect, it relates to apparatus for continuously indicating the percentages of several components of a process or other stream while, at the same time, producing a record of the percentages of the components.

In the copending application of Elmer C. Miller, Serial No. 147,979, filed March 6, 1950, entitled Photometric Analyzer, now Patent #2,612,608, there is described a photometer producing an electrical output which successively represents the concentration of two or more components in a stream or the percentage of one or more components in each of several different streams. Upon feeding this output to a recorder of conventional type, the recording medium indicates, for a predetermined period, the percentage of a first component, and then, for predetermined periods, the respective percentages of the other components. After all components have been recorded in this manner, the cycle of operations is repeated so that, for each component, there is a broken line upon the recording medium which may be readily followed to determine variations in any of the plurality of components being analyzed. In plant indicating work and automatic control operations, it is desirable to have a continuous indication of the percentages of the several components of interest which may be referred to at a glance without the necessity of following the broken lines upon the recording medium.

In accordance with my invention, a servo-receiver unit is provided for each component and each receiver is connected to a servo-transmitter, preferably actuated by the pen drive motor of the recorder, at all times when its corresponding component is analyzed. Thus, when the concentration of the first component is being recorded, the first receiver follows the variations in percentage of the first component. Thereafter, when the concentration of the second component is being recorded, the second receiver is connected to the transmitter and follows variations in concentration of the second component, this procedure being repeated as the other receivers are successively connected to the transmitter. Each receiver remains in the position last attained by it when it is disconnected from the transmitter and stays in such position until the recording cycle is completed and the composition of its assigned component is again recorded. Since the interval between successive cycles is small, the receivers continuously indicate the percentages of all components with a high degree of accuracy, this information being immediately available by a mere inspection of the positions of the receiver dials.

The recording apparatus of the invention is not limited to photometric analyzers but may be utilized to continuously and simultaneously indicate several outputs which are fed successively to a common recorder of the conventional type. In this manner, a continuous indication of all outputs is available at a glance without consulting the broken lines formed upon the recording medium.

Further in accordance with the invention, the timing circuit utilized to successively connect the receivers to the transmitter may be used, in a photometric analyzer, to cause fluid to pass through sample cells in the photometer in proper timed relation to carry out the successive analyses of the different components.

It is an object of the invention to improve the construction and operation of recorder systems.

It is a further object to provide a recorder system which indicates successively, upon a recording medium, the magnitude of several outputs and which also indicates these outputs simultaneously upon a set of dials actuated by servo-receivers so that the magnitude of all outputs may be determined at a glance without consulting the recording medium.

It is still a further object to provide remote indication of several outputs at a position spaced from the recorder unit where the outputs are successively recorded.

It is a still further object to provide apparatus for controlling the passage of sample fluids to several channels of a photometer in proper timed relation.

It is a still further object to provide apparatus which is rugged in construction, reliable in operation, durable, and which has a minimum number of moving parts.

Figure 2:
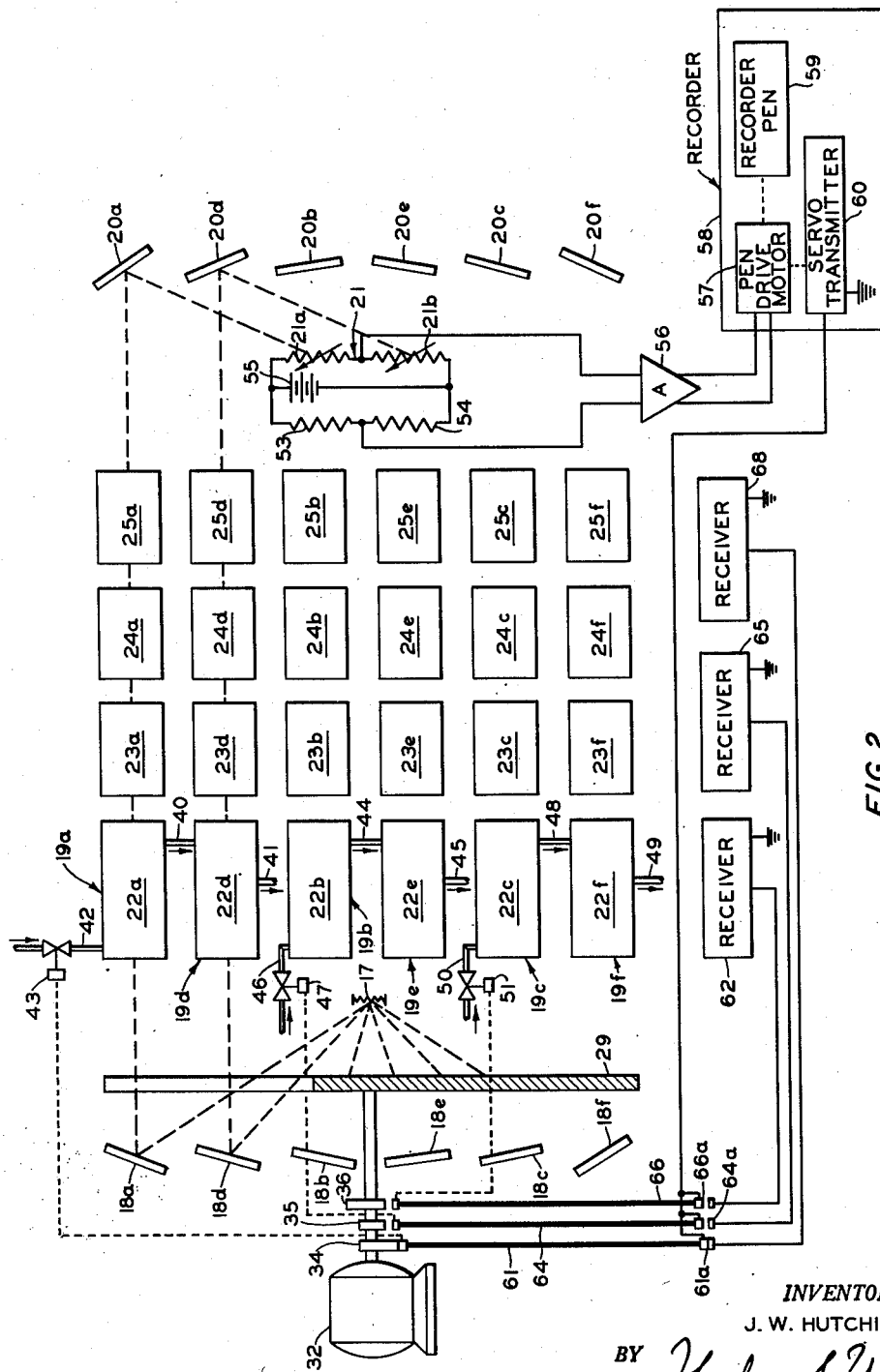

Various other objects, advantages and features of the invention will become apparent from the following detailed description taken in conjunction with the accompanying drawings, in which:

Figure 1 is a perspective view of a photometer suitable for use with the apparatus of my intion; and Figure 2 is a diagram illustrating the operation of my invention with the parts of the photometer of Figure 1 being shown schematically.

The photometer shown in Figure 1 comprises a base 10 carrying a plurality of spaced rods 11, 12 and 13 which support an upper deck 14 and a lower deck 15. The rods also support a spider 16 having a radiation source 17 positioned at the central region thereof. Where an infra-red unit is desired the source 17 can be an incandescent filament, and this source directs radiation upon a plurality of mirrors 18a to 18f, inclusive, the reflected beams passing through cell assemblies 19a to 19f, respectively, to mirrors 20a to 20f, which reflect the beams upon a twin radiation detector unit 21. Each cell assembly includes a sample cell 22, together with one or more filter cells 23, 24 and 25, each cell consisting of a cylinder of opaque material strapped or otherwise suitably secured to a channel 26 which, in turn, is suitably secured to the spider 16 and to a spider 28 carried by the rods 11, 12 and 13. Each cell is adapted to contain a fluid and, for this purpose, it is provided with a suitable inlet and outlet. The cells are further provided with transparent windows to permit the passage of radiation therethrough.

Suspended from the upper deck 14 is a shutter 29 of opaque material which is provided with diametrically opposite openings 30 and 31, these openings being adapted to permit passage of radiation beams through two diametrically opposite cell assemblies 19 while preventing passage of radiation through the other cell assemblies. The shutter 29 is adapted to be rotated by a motor 32 which is carried by the upper deck 14 and operates the shutter through a suitable gear train, not shown. The motor 32 has a shaft 33 which carries cams 34, 35 and 36, the purpose of which will be hereinafter explained. When the motor 32 is actuated, radiation beams pass successively through the set 19a, 19d; the set 19b, 19e; and the set 19c, 19f of cell assemblies to the respective elements of the twin detector unit 21. Preferably, and as shown by the copending application of Elmer C. Miller previously identified herein, a cam arrangement is provided to stop the motor as the openings 30, 31 are positioned adjacent each diametrically opposite set of cell assemblies, the motor remaining stationary until a further electrical impulse is fed thereto. The impulses are preferably derived from a timer, not shown.

Referring now to Figure 2, in a preferred embodiment of the invention, the sample cells 22a and 22d are connected by a conduit 40, the two interconnected cells being provided with an outlet 41 and an inlet 42 controlled by an electrically-actuated motor valve 43. In similar fashion, cells 22b and 22e are interconnected by a conduit 44 and the interconnected cells are provided with an outlet 45 and an inlet 46 controlled by an electrically-actuated motor valve 47 while the cells 22c and 22f are interconnected by a conduit 48, the interconnected cells being provided with an outlet 49, and an inlet 50 controlled by an electrically-actuated motor valve 51.

Where it is desired to provide a continuous analysis of three components of a stream, samples of the substance to be analyzed are admitted successively through inlets 42, 46 and 50 by proper timed operation of valves 43, 47 and 51. Alternatively, the substance to be analyzed may be admitted continuously to all of the sample cells. The cell assemblies 19a, 19b, and 19c are utilized to provide standard or reference paths and the cells 23, 24 and 25 of each group contain, respectively, pure samples of the components to be analyzed for. For example, if the three components to be analyzed for are n-butane, isobutane and propane, cells 23a, 23b and 23c might contain pure samples of n-butane, cells 24a, 24b, 24c might contain pure samples of isobutane, and cells 25a, 25b, 25c may contain pure samples of propane. As a result, radiation of frequencies corresponding to the absorption bands of these three components is removed so that the radiation passing through these cell assemblies is insensitive to the changes in concentration of any of the three components.

Furthermore, cells 23d and 24d are filled with pure samples of their respective components while cell 25d is either removed or no fluid is introduced therein. In the specific example under consideration, therefore, the beam passing through assembly 19d is insensitive to changes in the concentration of n-butane or isobutane in the test sample since cells 23d and 24d contain pure samples of n-butane and isobutane, respectively, but said beam is sensitive to the changes in concentration of propane in the test sample since no propane except that in cell 22d is positioned in the path of the beam. This results from the fact that cells 23d and 24d absorb radiation of frequencies corresponding to the principal absorption bands of n-butane or isobutane but do not remove frequencies corresponding to the absorption bands of propane. In similar fashion cells 23e and 25e are filled with pure samples of their respective components while cell 24e is either removed or contains no liquid. Thus, the beam passing through cell unit 19e is sensitive to changes in the second component but not to changes in the other components. In the specific example heretofore referred to, therefore, cell 23e may contain a pure sample of n-butane and cell 25a a pure sample of propane. As a result, the beam passing through cell assembly 19e is sensitive only to changes in isobutane concentration in the sample. Finally, cells 24f and 25f are filled with pure samples of their respective components while cell 23f is either removed or no liquid is placed therein. Accordingly, the radiation beam passing through cell assembly 19f is responsive to changes in concentration of the first component but not to changes of the other components. In the specific example, the beam passing through the cell 19f is sensitive to changes in n-butane but not to changes in isobutane or propane.

Assuming that the shutter 29 is in position to transmit radiation from source 17 through cell assemblies 19a and 19d, the respective beams of radiation are incident upon the sections 21a and 21b of the twin detector unit 21. Where infrared radiation is utilized, the detector unit may be a twin bolometer unit. These detector units are connected in a Wheatstone bridge circuit with balancing resistors 53 and 54, the bridge having a battery 55 connected between two opposite terminals thereof while leads extend from the other opposite terminals of the bridge to the input circuit of an amplifier 56, the output circuit of which is connected to the pen drive motor 57 of a recorder unit 58. The Wheatstone bridge circuit compares or substracts the intensity of the radiation beams incident upon the bolometers 21a and 21b.

The beam incident upon bolometer 21b is of standard intensity while the intensity of the beam incident upon bolometer 21a varies in accordance with changes in composition of the third component in the test sample. Thus, changes in temperature, pressure, and the like, affect both beams in a similar manner, so that they produce no unbalance voltage in the bridge circuit, while changes in concentration of the third component affect only the beam passing through cell assembly 19d, and thereby produce an unbalance voltage proportional to the concentration of such third component in the sample passing through cells 19a and 19d. Accordingly, the amplifier output is representative of the concentration of the third component in the test sample. As a result, motor 57 drives the recorder pen 59 to produce, upon the recording medium, a record of the concentration of the third component.

The motor 57 is mechanically coupled to a servo-transmitter 60 which produces an electrical voltage representative of the position of the pen drive motor and, therefore, of the output of amplifier 56. With the parts in the position shown, cam 34 is engaged with a switch actuating member 61 which connects the output of the transmitter 60 through contacts 61a to a servo-receiver 62. Accordingly, receiver 62 also indicates the proportion of the third component in the test sample. It will be understood that the receiver may be mounted either close to the recorder unit or at a remote location. When cam 34 engages actuating member 61, valve 43 is also open to permit passage of sample through cells 22a and 22d.

After a predetermined period, the motor 32 is actuated to move shutter 29, Figure 1, to a position at which the radiation beams passing through cell assemblies 19a, 19d are interrupted and radiation is allowed to pass through cell assemblies 19b and 19e. Thereupon, the output of the bridge circuit is representative of the concentration of the second component in the test sample, and motor 57 drives recorder pen 59 so as to indicate the concentration of the second component. Responsive to the described movement of shutter 29, cam 34 is disengaged from actuator 61, thus closing valve 43 and stopping the flow of sample through cells 22a and 22d. Furthermore, the transmitter 60 is disconnected from receiver 62 with the result that the receiver remains in the position it occupied at the time the cam switch was opened until the next succeeding connection thereof to the transmitter 60.

Further responsive to the described movement of shutter 29, cam 35 engages an actuating member 64 with the result that valve 47 is opened to permit passage of sample fluid through cells 22b and 22e. Preferably, this opening of valve 47 occurs a short interval before the openings in shutter 29 permit the radiation beams to pass through cell assemblies 19b and 19e. The described movement of actuator 64 also closes contacts 64a, thus connecting the transmitter 60 to a servo-receiver 65. As a result, receiver 65 registers the concentration of the second component in the test sample.

At the end of a predetermined recording period, motor 32 is again actuated to rotate shutter 29 and interrupt the radiation beams passing through cell assemblies 19b and 19e, thereby to allow radiation beams to pass through cell assemblies 19c and 19f. Thereupon, the Wheatstone bridge and amplifier produce an output representative of the concentration of the first component which output is fed to the pen drive motor 57 and recorded. A this time, cam 35 moves out of engagement with actuator 64, thus closing valve 47 and stopping the flow of sample fluid to cells 22b and 22e. At the same time, contacts 64a are opened, thus disconnecting receiver 65 from the transmitter so that it remains in the position occupied at the opening of the contacts until the next succeeding energization thereof.

The last described movement of the motor causes cam 36 to engage an actuating member 66 which opens valve 51 and permits sample to pass through cells 22c and 22f, this action occurring a short time before the shutter openings move into position to allow radiation beams to pass through cell assemblies 19c and 19f. The actuator 66 also closes contacts 66a, thus connecting the transmitter 60 to a receiver 68 which, thereupon, indicates the concentration of the first component.

After a predetermined period, the motor is again actuated to move cam 36 out of engagement with actuator 66 and causes cam 34 to engage actuator 61. Thereupon, the preceding cycle of operations is repeated.

It will be apparent, therefore, that during each cycle of operation there are three recording periods, the pen 59 recording the concentration of a different component during each period. This produces three broken lines upon the recording medium of unit 58 which indicate the concentrations of the three components. However, the receivers 62, 65 and 68 at all times simultaneously indicate the concentrations of the three components. This results from the fact that receiver 62 is only connected to the servo-transmitter when the pen drive motor represents the concentration of the third component. At other times, the receiver remains in the position occupied at the time it was disconnected from the transmitter. Since there is little variation in concentration between successive cycles of operation, the receiver 62 continuously indicates the concentration of the third component. In similar fashion, receiver 65 continuously indicates the concentration of the second component, and receiver 68 continuously indicates the concentration of the first component.

It will, of course, be evident that the photometric apparatus is capable of measuring the concentration of different numbers of components. Thus, two, four or even more components may be measured simply by providing additional cell assemblies, each having an associated receiver and cam. Furthermore, the apparatus need not necessarily analyze the concentration of various components of a single stream. For example, different streams can be fed to the different sets of cell assemblies, and each set of assemblies can be provided with suitable filtering materials so that the output voltage of the bridge represents the concentration of the component of interest.

The filtering means need not necessarily be a cell or a plurality of cells filled with a pure component. Solid materials which preferentially absorb desired frequencies of radiation can be substituted for the filter cells and, in some cases, the filters can be partially or wholly eliminated when the components of the sample do not have overlapping absorption bands. Finally, the sample need not be passed successively through two cells, such as cells 22a and 22d. The reference path for providing radiation which, when compared with the radiation passing through the sample, yields a quantity proportional to the concentration of the sample, can be obtained in various other ways familiar to those skilled in the art.

I also contemplate, where a single stream has several components under analysis, that a single reference cell assembly, such as assembly 19a, can be utilized to provide the reference radiation level for all the components. In this case, radiation passes through the standard cell assembly without interference by the shutter 29 and this radiation is continuously focused upon detector unit 21a, the shutter acting to pass radiation beams, at timed intervals, successively through the other cell units to the detector 21b.

It will also be apparent that the servo-transmitter unit of this invention has utility in applications other than recording the output of a photometer. In fact, in any case where several outputs are fed successively to a common recorder of the conventional type, the transmitter and receiver unit of my invention may be utilized to continuously indicate the magnitude of the several recorded quantities. Furthermore, the cam-actuated valve controlling unites of my invention have utility in other types of photometers which do not utilize the servo-transmitter and receiver unit of my invention, although both units are well adapted to the control by a single cam switch unit.

While the invention has been described in connection with present preferred embodiments thereof, it is to be understood that this description is illustrative only and is not intended to limit the invention, the scope of which is defined by the appended claims.

I claim:

1. A recording system for simultaneously indicating the magnitude of a plurality of electrical signals which comprises, in combination, an electric motor, means for periodically applying a plurality of electrical signals to be recorded, in succession, to said motor to cause rotation thereof, a servo-transmitter actuated by said motor whereby the magnitude of the output signal of said servo-transmitter is proportional to the rotation of said motor, a plurality of servo-receivers, one for each signal to be recorded, and means for periodically connecting said receivers, in succession, to said servo-transmitter in the same timed relation as that in which the signals are successively applied to said motor.

2. In a recording system, in combination, an electrical motor, a detector unit for producing an output voltage, timing mechanism for periodically feeding a plurality of quantities to be recorded, in succession, to said detector, whereby the detector output voltage fluctuates cyclically, each cycle consisting of timed periods during which the detector is energized by the respective quantities to be recorded, means for applying said output voltage to said motor, a servo-transmitter actuated by said motor whereby the magnitude of the output signal of said servo-transmitter is proportional to the rotation of said motor, a plurality of servo-receivers, one for each quantity to be recorded, and a cam switch driven by said timing mechanism to connect said receivers, in succession, to said transmitter so that each receiver is connected to the transmitter during a corresponding timed period in each cycle.

3. In a recording system, in combination, an electrical motor, a detector unit for producing an output voltage, timing mechanism for periodically feeding a plurality of quantities to be recorded, in succession, to said detector, whereby the detector output voltage fluctuates cyclically, each cycle consisting of timed periods during which the detector is energized by the respective quantities to be recorded, means for applying said output voltage to said motor, a servo-transmitter actuated by said motor whereby the magnitude of the output signal of said servo-transmitter is proportional to the rotation of said motor, a plurality of servo-receivers, one for each quantity to be recorded, and a cam switch driven by said timing mechanism to successively connect said transmitter to the receivers, each receiver being connected during a corresponding timed period in each cycle.

4. Apparatus for continuously analyzing for a plurality of components which comprises, in combination, a radiation source, a radiation detector, reflecting means to form a plurality of radiation beams extending between said source and said detector, a cell disposed in the path of each radiation beam and adapted to hold a substance preferentially absorbing certain wave lengths of said radiation, means for successively permitting passage of at least one selected beam of radiation between said source and said detector while preventing the passage of the other beams between said source and said detector, whereby the detector output is successively representative of the composition of substances in certain of said cells, a servo-transmitter responsive to the output of said detector, a plurality of servo-receivers, and coupling means actuated by said last-mentioned means for periodically connecting said servo-receivers, in succession, to said servo-transmitter.

5. Apparatus for continuously indicating the analysis of a plurality of components which comprises, in combination, a radiation source, a radiation detector, means for forming a plurality of radiation beams extending between said source and said detector, a plurality of cells disposed in the path of the respective radiation beams, each cell being adapted to hold a substance preferentially absorbing characteristic wave lengths of radiation, a movable shutter of opaque material disposed in the path of said radiation beams, said shutter having at least one opening therein for permitting passage of at least one selected beam of radiation therethrough, a motor for driving said shutter so as to successively permit passage of selected beams of radiation between the source and detector, a servo-transmitter responsive to the output of said detector, a plurality of servo-receivers, and coupling means controlled by said motor for selectively connecting said receivers to said transmitter in timed relation with the shutter movement, whereby each receiver is connected to the transmitter as a selected beam of radiation passes from the source to the detector.

6. Apparatus for continuously indicating the analysis of a plurality of components which comprises, in combination, a radiation source, a radiation detector, means for forming a plurality of radiation beams extending between said source and said detector, a plurality of cells disposed in the path of the respective radiation beams, each cell being adapted to hold a substance preferentially absorbing characteristic wave lengths of radiation, a movable shutter of opaque material disposed in the path of said radiation beams, said shutter having at least one opening therein for permitting passage of at least one selected beam of radiation therethrough, a motor for driving said shutter so as to successively permit passage of selected beams of radiation between the source and detector, a servo-transmitter responsive to the output of said detector, a plurality of servo-receivers, and a cam switch driven by said shutter driving motor to successively connect said receivers to said transmitter, the cams of said switch being constructed and arranged to connect each receiver to the transmitter as at least one selected beam of radiation passes between the source and the detector through one of said cells.

7. In a photometric analyzer, in combination, a radiation source, a pair of radiation detectors, reflecting means to form a plurality of radiation beams extending between said source and said detectors, a cell disposed in the path of each radiation beam, each cell being adapted to hold a sample liquid to be traversed by said beam, a conduit connecting two of said cells to form a first set of cells, a conduit connecting two other cells to form a second set of cells, filter cells in the path of at least one beam of each set to preferentially absorb radiation of preselected frequencies therefrom, a shutter of opaque material disposed in the path of said radiation beams, said shutter having openings formed therein to permit passage of radiation beams through a selected set of cells to the respective detectors, a motor for driving said shutter so that radiation successively passes through the sets of cells, an electrically-actuated motor valve to control passage of liquid to each set of cells, and a cam switch driven by said motor to successively actuate said valves just prior to the time at which the shutter openings permit passage of radiation through the associated set of cells.

8. In a photometric analyzer, in combination, a radiation source, a pair of radiation detectors, reflecting means to form a plurality of radiation beams extending between said source and said detectors, a cell disposed in the path of each radiation beam, each cell being adapted to hold a sample liquid to be traversed by said beam, a conduit connecting two of said cells to form a first set of cells, a conduit connecting two other cells to form a second set of cells, filter cells in the path of at least one beam of each set to preferentially absorb radiation of preselected frequencies therefrom, a shutter of opaque material disposed in the path of said radiation beams, said shutter having openings formed therein to permit passage of radiation beams through a selected set of cells to the respective detectors, a motor for driving said shutter so that radiation successively passes through the sets of cells, a servo-transmitter responsive to the output of said detector, a plurality of servo-receivers, one for each set of cells, and means driven by said shutter driving motor to successively connect said receivers to said transmitter in timed relation so that each receiver is connected to the transmitter when a selected set of cells transmits the radiation passing from said source to said detectors.

9. In a photometric anaylzer, in combination, a radiation source, a pair of radiation detectors, reflecting means to form a plurality of radiation beams extending between said source and said detectors, a cell disposed in the path of each radiation beam, each cell being adapted to hold a sample liquid to be traversed by said beam, a conduit connecting two of said cells to form a first set of cells, a conduit connecting two other cells to form a second set of cells, filter cells in the path of at least one beam of each set to preferentially absorb radiation of preselected frequencies therefrom, a shutter of opaque material disposed in the path of said radiation beams, said shutter having openings formed therein to permit passage of radiation beams through a selected set of cells to the respective detectors, a motor for driving said shutter so that radiation successively passes through the sets of cells, a servo-transmitter responsive to the output of said detector, and a plurality of servo-receivers, one for each set of cells, a cam switch driven by said shutter driving motor to successively connect said receivers to said transmitter, said cams being constructed and arranged to connect each receiver to the transmitter as said shutter permits passage of radiation through a selected set of cells.

10. In a photometric analyzer, in combination, a radiation source, a pair of radiation detectors, reflecting means to form a plurality of radiation beams extending between said source and said detectors, a cell disposed in the path of each radiation beam, each cell being adapted to hold a sample liquid to be traversed by said beam, a conduit connecting two of said cells to form a first set of cells, a conduit connecting two other cells to form a second set of cells, filter cells in the path of at least one beam of each set to preferentially absorb radiation of preselected frequencies therefrom, a shutter of opaque material disposed in the path of said radiation beams, said shutter having openings formed therein to permit passage of radiation beams through a selected set of cells to the respective detectors, a motor for driving said shutter so that radiation successively passes through the sets of cells, a recorder unit responsive to the difference in output of said detector units, said recorder including a pen drive motor, and a servo-transmitter actuated by said motor, a plurality of servo-receivers, one for each set of cells, a plurality of electrically-actuated motor valves for controlling the passage of liquid to the respective sets of cells, and a cam switch driven by said shutter driving motor to successively connect said receivers to said transmitter, said cams being constructed and arranged to connect each receiver to the transmitter when the shutter permits passage of radiation through a selected set of cells, said cam switch further operating said valves in timed relation to open the respective valves just before the shutter moves to a position to allow radiation to pass through its associated set of cells.

11. Apparatus constructed in accordance with claim 10 in which the radiation source is an incandescent filament and the radiation detectors are bolometers.

12. Apparatus constructed in accordance with claim 11 in which the voltage difference is obtained by a pair of balancing resistors connected in a Wheatstone bridge circuit with said bolometers, a battery being connected between two opposite terminals of the bridge and the recorder input being taken from the other terminals of the bridge.

JOSEPH W. HUTCHINS.

References Cited in the file of this patent

UNITED STATES PATENTS

| Number | Name | Date |
|--------|------|------|
| 2,135,991 | Nessell | Nov. 8, 1938 |
| 2,434,189 | Ziebolz | Jan. 8, 1948 |

OTHER REFERENCES

A Versatile Infra-Red Spectrograph, by R. A. Oetjen, Journal Optical Society, December 1945, pp. 743–754.

An Optical-Acoustic Method of Gas Analysis, by F. I. Callisen, Nature, February 1, 1947, page 167.

Infra-Red Instrumentation and Techniques, by Van Zandt Williams, published in The Review of Scientific Instruments, March 1948, pp. 176–178.